Patented July 5, 1949

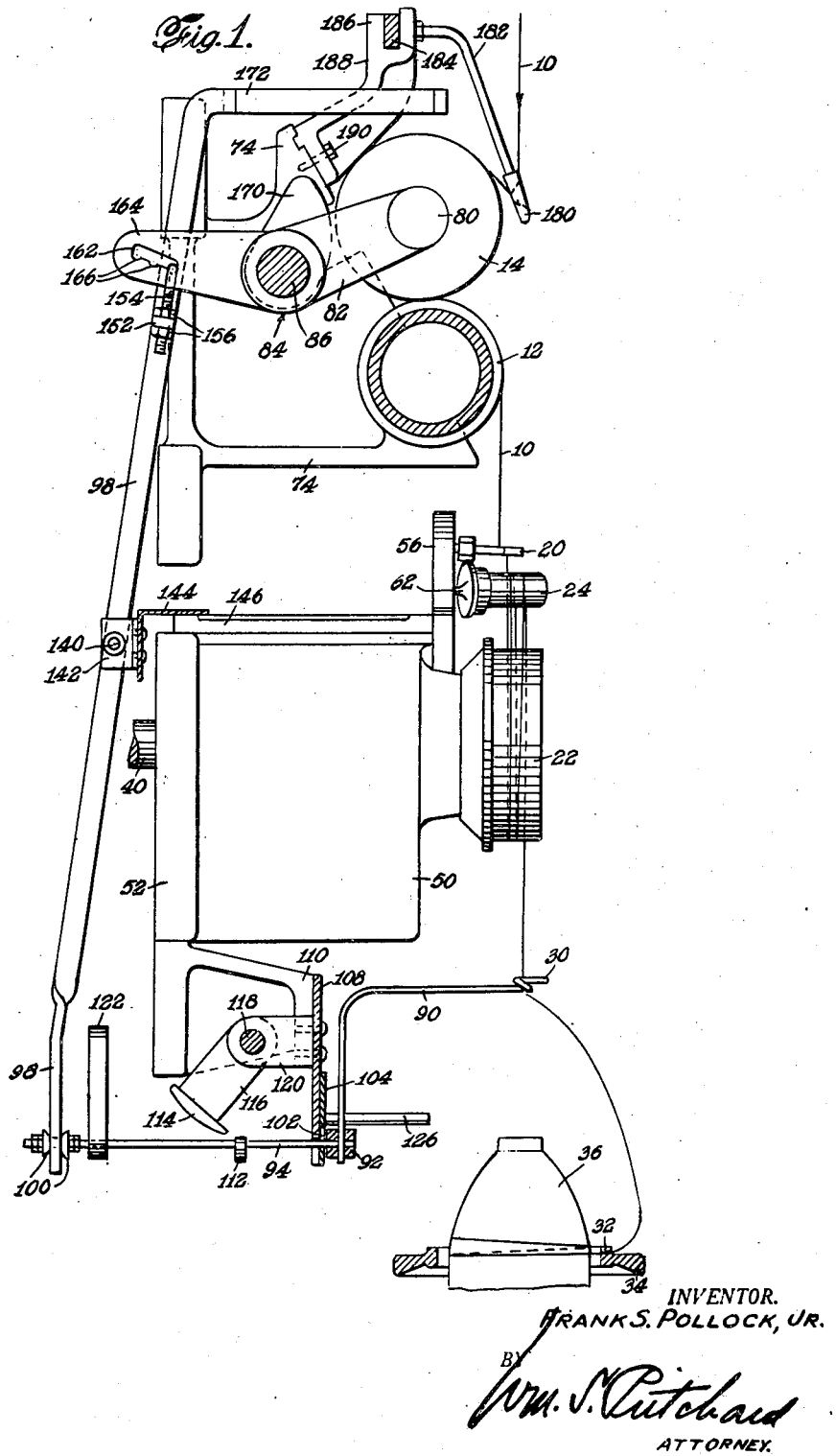

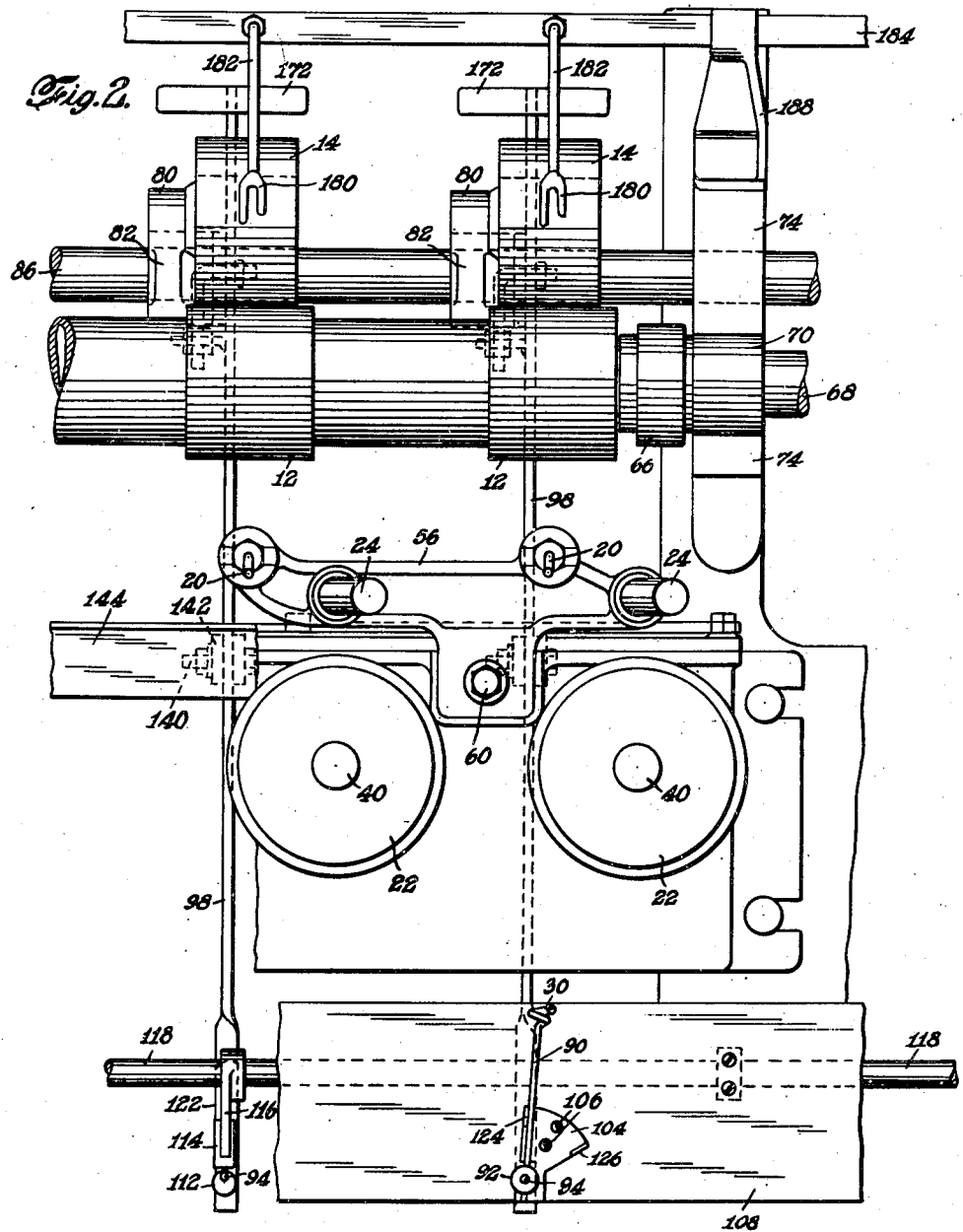

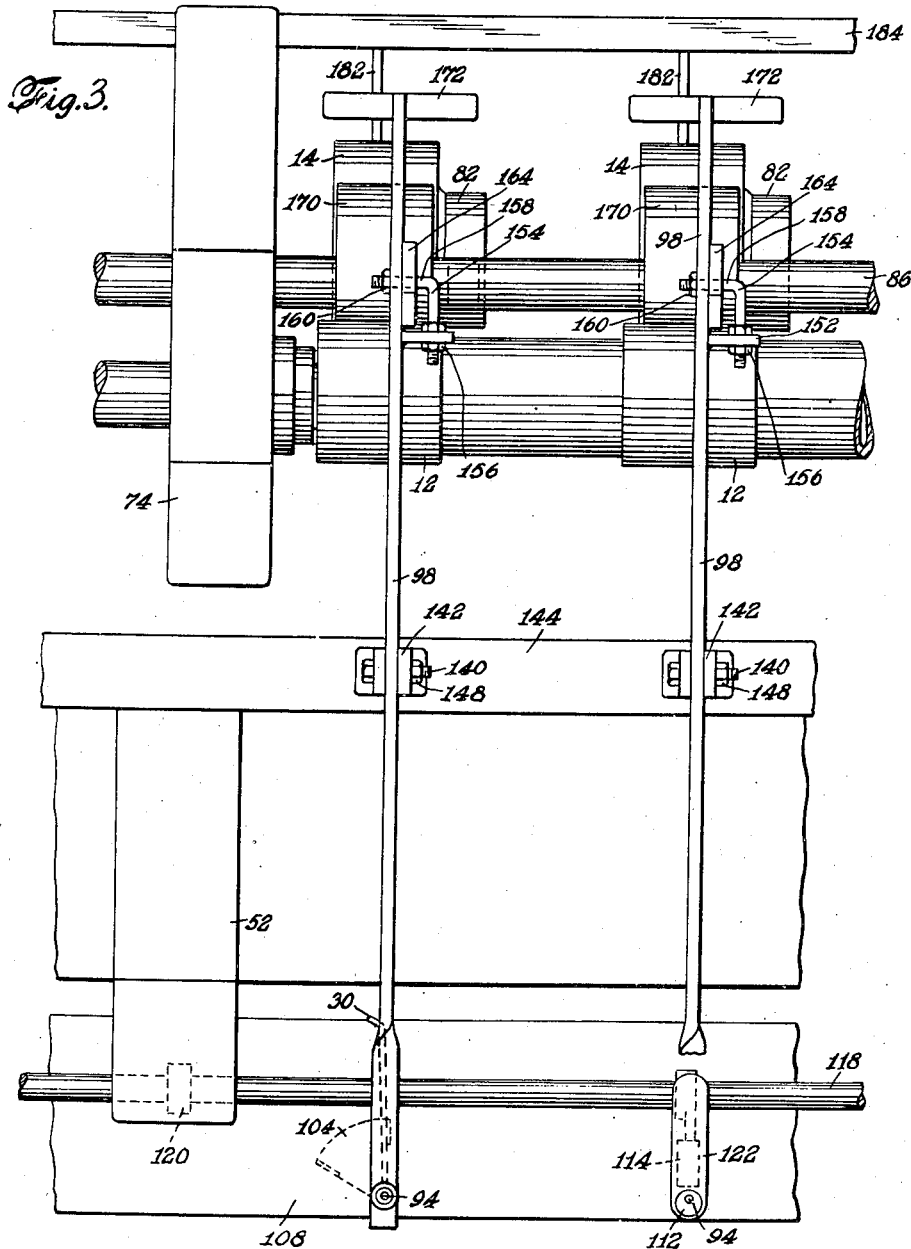

2,474,912

UNITED STATES PATENT OFFICE 2,474,912

DRAWTWISTER

Frank S. Pollock, Jr., Martinsville, Va., assignor to E. I. du Pont de Nemours & Company, Wilmington, Del., a corporation of Delaware Application March 16, 1946, Serial No. 654,913

5 Claims. (Cl. 28—71.4)

This invention relates to textile apparatus. More particularly, it relates to a new and improved drawtwister for synthetic linear polyamide filaments, yarns, etc.

The synthetic linear polyamides are of the type generally disclosed in Carothers United States Patents 2,071,250, 2,071,253 and 2,130,948. The polyamides of this kind, generally speaking, comprise the reaction product of linear polymer-forming compositions containing amide-forming groups, for example, reacting material consisting essentially of bifunctional molecules, each containing two reactive groups which are complementary to reactive groups in other molecules and which include complementary amide-forming groups. These polyamides can be obtained by the methods given in the above-mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactants have an intrinsic viscosity of at least 0.4 and a unit length of at least 7, where "unit length" is defined as in United States Patents 2,071,253 and 2,130,948. The average number of carbon atoms separating the amide groups in these polyamides is at least two.

These linear polyamides include also polymers, as, for instance, the polyester-amides, obtained by admixture of other linear polymer-forming reactants, as, for instance, glycol-dibasic acid mixtures of hydroxy acids, with the mentioned polyamide-forming reactants.

Both the simple and modified linear polyamides contain the recurring amide groups

in which X is oxygen or sulfur and R is hydrogen or a monovalent hydrocarbon radical, as an integral part of the main chain of atoms in the polymer. On hydrolysis with hydrochloric acid, the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

These linear polymers can be formed directly into filaments from the molten state, and the filaments so formed are capable of being cold drawn (permanently elongated to from 400% to 500% of their original length in the solid state) under the application of stress into filaments and the like exhibiting, upon X-ray examination, crystallite orientation along the fiber axis. These cold drawn and oriented filaments possess certain characteristics not possessed by the filaments previous to the cold drawing, which adapt them to a wide range of utility in the textile field. The greatest utility is obtained when the filaments are so produced as to possess uniform physical characteristics which, in turn, can be obtained only through uniform drawing of the filaments.

United States Patent 2,289,232 discloses cold drawing of synthetic linear polyamide yarn by feeding the yarn, with multiple wraps, about a pair of positively driven rolls, the second roll having a peripheral speed greater than the first, and localizing the drawn point of the yarn whereby uniformly cold drawn synthetic linear polyamide yarns and filaments are obtained.

Cold drawing of the synthetic linear polyamide yarn has also been accomplished on a drawtwister wherein the yarn, after being drawn, was, in an operation subsequent to but continuous with the drawing operation, twisted and wound upon a shipping bobbin. In this drawtwisting operation, the yarn passed over a feed roll, a snubbing pin to localize the draw point, a draw roll and a separator roll before being wound upon the shipping bobbin. However, the drawtwister was of such design and construction that when a break occurred, the yarn generally continued to wrap on the draw roll or feed roll and such yarn had to be discarded as waste. In some instances, yarn also was back-wound from the shipping bobbin to the draw roll again (called a "back-wrap"), and such back-wrap also had to be discarded as waste. Large wraps are hazardous to the operator, to the maintenance of the machine, and to the quality of the yarn and package of adjacent positions.

An object of this invention is to provide a new and improved drawtwister.

Another object of this invention is to provide a drawtwister wherein, when a yarn break occurs, the feed of the yarn from the source of supply will be interrupted.

An additional object of this invention is to provide a drawtwister having means to prevent back-wraps.

Other and additional objects will become apparent hereinafter.

The above objects of the invention are accomplished, in general, by equipping a drawtwister with a fall wire which, when a back-wrap or break occurs, actuates a brake mechanism to interrupt the feed of the yarn to the drawtwisting mechanism.

The details of the invention will be more clearly apparent by reference to the following description and accompanying drawings forming a part of this invention and wherein:

Figure 1 is a side elevation, partly in section and partly broken away and with parts of the frame omitted, of one position of a drawtwister embodying the principles of this invention;

Figure 2 is a front elevation of the drawtwister showing two adjacent positions, with the winding mechanism omitted; and Figure 3 is a rear view of the drawtwister shown in Figure 2.

For the sake of brevity and convenience, since all positions are identical, only one position of the drawtwister will be described in detail and such other parts of the apparatus as will be necessary to adequately explain the invention.

Referring now to the drawings wherein like reference numerals designate like parts, the reference numeral 10 designates a yarn which is fed from a suitable source of supply (not shown) by a feed roll 12. A cork roller 14 cooperates with the feed roll 12 to maintain the yarn 10 in feeding relationship and also to prevent slippage on the feed roll 12. From the feed roll 12, the yarn 10 passes about a snubbing pin 20 and thence around draw roll 22 a sufficient number of times to prevent slippage thereon. The peripheral speed of the draw roll 22 is higher than the peripheral speed of the feed roll 12, and the precise speeds thereof depend on the draw ratio desired. A separator roll 24 cooperates with the yarn in each successive pass around the draw roll 22 in order to displace the yarn laterally on the draw roll so that in its successive passes the yarn will not track on itself. From the draw roll 22, the yarn passes through a yarn guide 30, and thence to a follower 32, which is positioned on a ring 34 of a ring twisting apparatus, to be wound onto pirn 36, which is rotated in the usual manner.

The snubbing pin 20 which localizes the draw point has a diameter up to ½", and preferably has a diameter of from ⅛" to ¼". The yarn is passed about this snubbing pin one or several times so that the tension developed in the yarn by its passage around the pin will preferably be at least one-half the tension required in the drawing operation. It is preferred that the snubbing pin be mounted with a slight downward tilt, as shown in Figure 1, so that successive turns of the yarn about the snubbing pin will remain separated.

The draw roll 22 is secured to one end of a shaft 40 which is appropriately mounted in a draw roll box 50 and driven in any appropriate manner by means not shown. The draw roll box 50 is appropriately mounted on the vertical member 52 of the frame of the machine.

As shown in Figures 1 and 2, the snubbing pin 20 is carried on a bracket 56 secured to the draw roll box 50 by screw 60. The separator roll 24, which is freely rotatable, is mounted at one end of a shaft 62, also carried by the bracket 56. It is to be noted that the separator roll 24 is mounted askew to the draw roll 22.

The feed roll 12 is secured, as shown in Figure 2, by a coupling 66 to a driven shaft 68 which is rotatably mounted in a bearing 70 on a casting 74.

The cork roller 14 is rotatably mounted on a pin 80 carried at one end of an arm 82 of a lever 84 pivotally mounted on a rod 86. In operative position, roller 14 is in superposed and contactual relationship with feed roll 12 but is adapted to be moved to inoperative position (out of contactual relationship with feed roll 12), as will be hereafter explained.

The guide 30 is formed at one end of a fall wire 90, whose other end is secured in a bearing 92. One end of a shaft 94 is also secured in the bearing 92, and the opposite end of the shaft 94 is threaded and extends through a connecting link 98. Nuts 100 on either side of link 98 secure the connecting link 98 in position on shaft 94.

Connecting link 98 supports shaft 94 at the end to which it is connected. Shaft 94, adjacent the bearing 92, extends through and is rotatably and slidably supported in an aperture 102 in a plate 104 which is secured by screws 106 to a cross-member 108 which, in turn, is secured to the section 110 of the frame.

A butterfly 112 is secured on the shaft 94 so that in normal position it will be out of the path of movement of a shoe 114 on one end of a rock arm 116. The other end of the rock arm 116 is secured to an oscillating shaft 118 carried by a bracket 120 secured to the cross-member 108. The oscillating shaft 118 is actuated in any well-known manner by means not shown.

For reasons which will become apparent hereinafter, a counterbalance weight 122 is secured to the shaft 94, and stops 124 and 126 on the plate 104 limit the movement of the fall wire 90 in the upward and downward directions respectively.

Link 98 is pivotally mounted on a pivot 140 carried in a bifurcated member 142 secured to an angle iron 144 appropriately secured to the section 146 of the frame. Nut 148 secures the pivot 140 in position.

Link 98 is provided with a shelf 152 in which the threaded end of a finger 154 is positioned and to which it is secured by nuts 156. Finger 154, which extends upwardly, is bent at right angles, and the end of the horizontally extending portion 158 extends through link 98 and is secured thereto by the nut 160. As shown in Figure 1, the horizontal portion 158 of the finger also extends through a slot 162 in and adjacent one end of an arm 164 of a lever 84. The slot 162 is provided with a plurality of spaced grooves 166. When the horizontal portion 158 of the finger is seated in any of said grooves 166, the lever 84 is locked in position on the rod 86. Thus, when the horizontal portion of the finger 154 is seated in the groove 166, at the extreme right as viewed in Figure 1, lever 84 will be locked in position with roller 14 in contactual relationship with feed roll 12. When, however, the link 98 is moved about the pivot 140 so that the finger 154 is urged toward the left as viewed in Figure 1, the horizontal member 158 will be forced from the groove 166 in which it was originally seated and be forced to enter and seat itself in a groove to the left thereof, such as at the extreme left. This movement of the finger 154 causes the lever 84 to move about its pivot (rod 86) whereby roller 14 is lifted off the feed roll 12. Upon seating of the horizontal portion 158 of the finger 154 in the appropriate groove, the lever 84 will be locked in the position wherein roller 14 will be maintained out of contactual relationship with roll 12.

A brake 170 secured on the rod 86 is so positioned that when roller 14 is removed from contactual relationship with roll 12, as previously described, it (roller 14) will be pushed firmly against said brake.

Link 98 terminates at the top thereof with a hand grip portion 172 which is adapted to be manipulated by the operator for resetting the apparatus after a yarn break has occurred and has been eliminated.

A yarn guide 180 aids in conducting the yarn from its source of supply (not shown) onto roller 14 so that it can pass onto the feed roll 12. The guide 180 is carried at one end of a holder 182, the other end of the holder being secured to a cross-piece 184. The cross-piece 184 is mounted in the fork 186 of a bracket 188, which is secured by lag screws 190 to the casting 74 of the frame.

Before operation is begun, link 98 is adjusted so that the section 158 of the finger 154 lies in the groove 166 of the arm 164 so that lever 84 is locked into position with roller 14 and is in contactual relationship with feed roll 12 and brake 170 is in spaced relationship with respect to roller 14. Feed roll 12, draw roll 22 and the oscillating shaft 118 are actuated, the latter (shaft 118) being oscillated so that shoe 114 will have a stroke of about 1". The yarn is threaded through the apparatus from the guide 180, about roller 14, over roll 12, and thence around snubbing pin 20. From the snubbing pin 20, the yarn makes a plurality of passes about draw roll 22, it being understood that between each successive pass of the yarn about draw roll 22, the yarn passes over the freely rotating separator roll 24. From draw roll 22, the yarn passes through thread guide 30 to the follower 32 and is then twisted and wound onto the rotating pirn 36, as previously described.

The tension of the balloon of the yarn between yarn guide 30 and the follower 32 overcomes the action of the counterweight 122 and maintains guide 30 in position for the yarn to pass thereto from draw roll 22. In this position, the fall wire 90 is in contact with the stop element 124 and the butterfly 112 is out of the path of travel of the oscillating shoe 114. Also, link 98 is so positioned that the brake 170 is out of contact with roll 12. When a break or back-wrap occurs, the fall wire 90 drops, turning in its bearing 92 in a plane parallel to the front face of the draw roll box 50. The falling movement of the fall wire 90 is limited by the stop element 126. The turning of the bearing 92 rotates shaft 94 so that the butterfly 112 is positioned in the path of travel of the oscillating shoe 114, with the result that when the oscillating shoe 114 engages the butterfly 112 it will exert a force thereon sufficient to shift the shaft 94 and the fall wire 90 (attached to shaft 94 through bearing 92) laterally, as, for example, to the right in Figure 1. This lateral movement of the shaft 94 is imparted to the link 98 so that it will move about the pivot 140. This movement of the link 98 will cause the horizontal member 158 of the finger 154 to successively release the lever 84 from locked position, move the lever 84 about the rod 86 to lift roller 14 off of roll 12 and urge it against the brake 170, and thereafter lock the lever 84 in this position, as previously described. This operation interrupts and stops the yarn feed. The lateral shift of fall wire 90 moves attached thread guide 30 out of vertical alignment with draw roll 22 and thus prevents backwinding of yarn from the pirn onto the draw roll. The apparatus is manually reset by manipulation of the hand grip 172.

By arrangement of the parts, and particularly the position of the butterfly on the shaft, the feed of yarn can be interrupted upon movement of the fall wire when the tension of the yarn passing through the guide decreases to a predetermined value, such as, for example, will result in an undesirable package formation.

As previously mentioned, the respective peripheral speeds of the feed roll 12 and the draw roll 22 are such as to produce the desired draw ratio. The diameters of the feed roll 12 and the draw roll 22 may be the same or different, and in either case the respective peripheral speeds thereof are such as to impart the desired drawing effect in the yarn.

The rolls 12 and 22 can be formed of any suitable material which is not deleteriously affected by and which itself does not deleteriously affect the yarn.

Roller 14, which in operative position is in contact with feed roll 12, is preferably, as hereinbefore described, formed of cork, though it is obvious that it can be formed of other suitable materials.

The snubbing pin 20 which localizes and concentrates the draw point is preferably formed of agate. However, smooth pins of other materials, such as stainless steel, chromium plated steel, porcelain, Bakelite (phenol-aldehyde resin), methyl methacrylate resin, etc., can be used.

While the apparatus has been described specifically in connection with the use of a snubbing pin, it is obvious that use may be made of any means which localizes the draw point within the desired limits. Various known tension devices placed in relation to the other parts of the drawing set-up, as previously described, may be substituted for the snubbing pin. Thus, for example, instead of pins, sheets, or plates shaped to present a suitable curved surface convex to the yarn being drawn may be used with advantage. The interposed tension device will preferably impart to the yarn a tension of at least 50% of the total tension required to cold draw the yarn in order to localize the draw point at the tension device.

Though the invention has been specifically described in connection with a ring twister, it is to be understood that the invention is not restricted thereto. Any of the known textile twisting mechanisms, such as flyers, can also be used. Likewise, the invention is capable of use in apparatus wherein the yarn is wound on a rotating bobbin positioned horizontally.

The invention provides a mechanism which produces a yarn package of good formation. It also effectively interrupts the feed of the yarn when a break occurs so that the raw yarn is prevented from wrapping around the draw or feed rolls. Additionally, by reason of the lateral shift of the thread guide out of vertical alignment with the draw roll, the invention effectively prevents the drawn twisted yarn backwinding from the pirn on to the draw roll. The elimination of wraps, and particularly back-wraps, not only reduces the waste of raw yarn, and particularly drawn twisted and wound yarn, but also removes the hazards of large wraps to the operator, to the maintenance of the machine, and to the quality of the yarn and packages of adjacent positions. The mechanism for braking the feed of the yarn is relatively simple and can be installed on standard types of machines.

Since it is obvious that many changes and modifications can be made in the above-described details without departing from the nature and spirit of the invention, it is to be understood that the invention is not to be limited thereto except as set forth in the appended claims.

I claim:

1. In a yarn drawing apparatus having a feed roll, a positively driven draw roll and a collection device on which the drawn yarn is wound, a guide adapted to be positioned in guiding position intermediate said draw roll and collection device, a fall wire carrying said guide and adapted to maintain said guide in guiding position by the tension of the yarn passing through said guide from said draw roll to said collection device, a rotatably and slidably mounted shaft, an oscillating member, a butterfly on said shaft and normally positioned out of the path of movement of said oscillating member, means connecting said shaft to said fall wire whereby when said fall wire moves, due to a decrease in tension of the yarn passing through said guide, from the position in which it normally maintains said guide in guiding position, said shaft will be rotated to dispose said butterfly in the path of movement of said oscillating member and upon engagement of said butterfly by said oscillating member said shaft will be shifted laterally to shift said guide laterally out of yarn guiding position relative to the draw roll and means actuated by the shifting movement of said shaft to interrupt the feed of the yarn.

2. In a yarn drawing apparatus having a feed roll, a positively driven draw roll and a collection device on which the drawn yarn is wound, a roll normally in contact with said feed roll to feed the yarn, a guide adapted to be positioned in guiding position intermediate said draw roll and collection device, a fall wire carrying said guide and adapted to maintain said guide in guiding position by the tension of the yarn passing through said guide from said draw roll to said collection device, a rotatably and slidably mounted shaft, an oscillating member, a butterfly on said shaft and normally positioned out of the path of movement of said oscillating member, means connecting said shaft to said fall wire whereby when said fall wire moves, due to a decrease in tension of the yarn passing through said guide, from the position in which it normally maintains said guide in guiding position, said shaft will be rotated to dispose said butterfly in the path of movement of said oscillating member and upon engagement of said butterfly by said oscillating member said shaft will be shifted laterally to shift said guide laterally out of yarn guiding position relative to the draw roll, a pivoted link secured to said shaft, and means connecting said link to the roll in contact with the feed roll whereby when said link is actuated by the shifting of the shaft said roll will be moved out of contactual relationship with said feed roll.

3. In a yarn drawing apparatus having a feed roll, a positively driven draw roll and a collection device on which the drawn yarn is wound, a roll normally in contact with said feed roll to feed the yarn, a snubber brake normally in spaced relationship to said rolls, a guide adapted to be positioned in guiding position intermediate said draw roll and collection device, a fall wire carrying said guide and adapted to maintain said guide in guiding position by the tension of the yarn passing through said guide from said draw roll to said collection device, a rotatably and slidably mounted shaft, an oscillating member, a butterfly on said shaft and normally positioned out of the path of movement of said oscillating member, means connecting said shaft to said fall wire whereby when said fall wire moves, due to a decrease in tension of the yarn passing through said guide, from the position in which it normally maintains said guide in guiding position, said shaft will be rotated to dispose said butterfly in the path of movement of said oscillating member and upon engagement of said butterfly by said oscillating member said shaft will be shifted laterally to shift said guide laterally out of yarn guiding position relative to the draw roll, a pivoted link secured to said shaft, and means connecting said link to the roll in contact with the feed roll whereby when said link is actuated by the shifting of said shaft said roll will be moved out of contactual relationship with the feed roll and urged against said brake.

4. In a yarn drawing apparatus having a feed roll, a positively driven draw roll and a collection device on which the drawn yarn is wound, a roll normally in contact with said feed roll to feed the yarn, a snubber brake normally in spaced relationship to said rolls, a guide adapted to be positioned in guiding position intermediate said draw roll and collection device, a fall wire carrying said guide and adapted to maintain said guide in guiding position by the tension of the yarn passing through said guide from said draw roll to said collection device, a rotatably and slidably mounted shaft, an oscillating member, a butterfly on said shaft and normally positioned out of the path of movement of said oscillating member, means connecting said shaft to said fall wire whereby when said fall wire moves, due to a decrease in tension of the yarn passing through said guide, from the position in which it normally maintains said guide in guiding position, said shaft will be rotated to dispose said butterfly in the path of movement of said oscillating member and upon engagement of said butterfly by said oscillating member said shaft will be shifted laterally to shift said guide laterally out of yarn guiding position relative to the draw roll, a pivoted link secured to said shaft, means connecting said link to the roll in contact with the feed roll whereby when said link is actuated by the shifting of said shaft said roll will be moved out of contactual relationship with the feed roll and urged against said brake, and means to lock said link to maintain said roll in the desired positions.

5. In a synthetic linear polyamide yarn drawing apparatus having a feed roll, a positively driven draw roll cooperating with said feed roll to cold draw the yarn passing therebetween and a collection device on which the twisted yarn is wound, a guide, a fall wire carrying said guide and adapted to maintain said guide in guiding position by the tension of the yarn passing therethrough from said draw roll to said collection device but when the yarn breaks said guide will move laterally out of guiding position and backwinding of the yarn from the collection device to said draw roll will be prevented, and means actuated by said fall wire when the yarn breaks or a backwrap occurs to interrupt the feed of said yarn.

FRANK S. POLLOCK, Jr.

REFERENCES CITED

The following references are of record in the file of this patent:

UNITED STATES PATENTS

| Number | Name | Date |
|---|---|---|
| 936,346 | Nunn | Oct. 12, 1909 |
| 2,045,079 | Haas | June 23, 1936 |
| 2,172,497 | Cadden | Sept. 12, 1939 |
| 2,185,245 | Cotchett | Jan. 2, 1940 |
| 2,212,691 | Kershaw | Aug. 27, 1940 |
| 2,226,135 | Newton | Dec. 24, 1940 |
| 2,289,232 | Babcock | July 7, 1942 |